Dec. 31, 1935.  O. D. TREIBER  2,025,836
INTERNAL COMBUSTION ENGINE AND VALVE APPARATUS THEREFOR
Filed July 1, 1933  5 Sheets-Sheet 3

Fig. 3

INVENTOR
O. D. Treiber
BY
ATTORNEYS

Fig. 4

UNITED STATES PATENT OFFICE 2,025,836

INTERNAL COMBUSTION ENGINE AND VALVE APPARATUS THEREFOR

Otis D. Treiber, Canton, Ohio, assignor to Hercules Motors Corporation, Canton, Ohio, a corporation of Ohio Application July 1, 1933, Serial No. 678,689

4 Claims. (Cl. 123—90)

The invention relates in general to internal combustion engines preferably of the compression ignition type, and in which preferably liquid hydrocarbon fuel is injected into the combustion chambers of the engine; and more particularly the invention relates to such an engine as set forth in my United States Letters Patent No. 1,960,093, issued May 22, 1934, for Compression ignition internal combustion engines, or my prior application filed February 3, 1933, Serial No. 655,079.

In the operation of compression ignition internal combustion engines, which may be termed compression ignition injection engines, it is desired to burn the liquid fuel at a time in relation to the position of the piston of each cylinder and at a rate or velocity of burning so as to create a rise in pressure in the burning fuel charge contained in the combustion chamber or chambers formed in part by each piston, so that as each piston passes over top dead center from the compression stroke into the power stroke, the velocity or rate of increase of the rising pressure in the burning fuel charge is such as to produce a desired maximum pressure and such as to maintain this maximum pressure substantially constant during the power stroke of the piston until combustion of the fuel charge is complete.

In the creation of this desired pressure rise in the burning charge it is necessary that the preferably atomized particles of the liquid hydrocarbon fuel be intimately contacted and mixed with the molecules of oxygen of the air introduced into the combustion chamber or chambers so that the uniting or combustion of the particles of fuel and the molecules of oxygen is effected at such rate so as to develop and maintain the desired pressure rise in the burning fuel charges as aforesaid.

In any particular compression ignition injection engine, the attainment of the desired character of fuel combustion as aforesaid, for any given speed of rotation of the crank shaft of the engine is evidenced by a relatively high mean indicated pressure in the combustion chambers of the engine.

On the other hand it is very desirable, particularly in the case of industrial and automotive engines, that the speed of rotation of the crank shaft be as high as possible, so as to obtain maximum power with minimum weight of engine.

As the number of crank shaft revolutions per unit of time increases, the time interval in which it is possible to mix, and unite or burn each fuel and air charge as aforesaid, becomes less in direct inverse ratio to the increase in the number of crank shaft revolutions per unit of time.

Consequently the usual dynamic and pressure conditions found suitable in the mixing and combustion chambers of relatively low speed compression ignition injection engines for a proper rate of mixing and uniting or burning of the hydrocarbon particles and the oxygen molecules is not adequate to effect proper mixing and uniting or burning as the crank shaft revolutions increase per unit of time.

The foregoing difficulties incident to the construction and operation of compression ignition injection engines is furthermore evidenced by the fact that prior to the production and operation of the first engine including among others the present improvements and the improvements of my said U. S. Letters Patent No. 1,960,093, the maximum generally known speed of rotation of the crank shaft of such an engine was only 1800 R. P. M. with a mean indicated pressure, or in other words, an indicated mean effective pressure of 100 to 110 pounds per square inch in the combustion chambers.

In my said U. S. Letters Patent No. 1,960,093, there is set forth an engine including among others the present improvements in part, and in which the preferably liquid hydrocarbon fuel is injected into the combustion chambers of the engine, and which is capable of operation at relatively high speeds of rotation of the crank shaft of the engine, which may be for example 2000 to 3000 R. P. M., and with a relatively high mean indicated pressure in the combustion chambers of the engine, which may be for example a mean indicated pressure of as high as 160 pounds per square inch at 2000 R. P. M.

In the compression ignition internal combustion engine of my said U. S. Letters Patent No. 1,960,093 and of the present application, the mixing and combustion chambers are so formed and arranged as to cause proper mixing and combustion of the injected fuel at high speeds of rotation of the crank shaft of the engine.

In general, the valve apparatus for such an engine must be mechanically suitable for the relatively high speed operation, and must be adequately lubricated.

In particular the preferred arrangement of the combustion chambers as set forth in my said U. S. Letters Patent 1,960,093, and also as set forth herein in conjunction with the present improvements, makes it desirable to use a "valve-in-head" construction; and in order to permit the interchangeable use in the engine of a crank case construction having a cam shaft mounted therein and which may also be used for making spark ignition engines, it is desired that the valves located in the head of the engine be operatively associated with a cam shaft operatively mounted in the crank case.

Such an arrangement may include the use of rocker arms for actuating the valves, and operatively mounted on the cylinder head, and push rods interposed between the cam shaft and the rocker arms for actuating the rocker arms by the usual rotation of the cam shaft.

For properly lubricating such valve apparatus, it is necessary that the lubricant, such as oil, which is provided in the crank case in the usual manner, be carried in proper amounts to the rocker arms mounted on, and valves operatively located in, the cylinder head, and that the excess lubricant carried to the rocker arms and valves be returned to the crank case.

It is particularly necessary in the case of a compression ignition internal combustion engine, that substantially no lubricating oil be admitted to the combustion chambers of the engine by leakage about the valve stems, as such admission of lubricating oil causes a smoky operation of the engine.

It is furthermore desirable and necessary, that the crank case gases be prevented from passing out of the crank case and up to and about the rocker arms and valves and associated parts, for the reason that crank case gases are of an acid nature and would cause corrosion of the rocker arms, valves, and associated parts if permitted to come in contact with the same.

In the usual construction of internal combustion engines more or less elaborate systems of separate oil supply tubes and oil return tubes and separate oil seals therefor are provided between the crank case and valve apparatus of "valve-in-head" engines.

In a "valve-in-head" engine in which the cam shaft is located in the crank case, and push rods extend between the cam shaft and rocker arms operatively mounted on the cylinder head, it is desirable in order to maintain the over-all bulk of the engine at a minimum that the push rods pass through the cylinder block.

Consequently it is desirable and necessary, that the push rods passing through the cylinder block be each surrounded by a tube or wall blocking off the push rods from the cooling chambers of the cylinder block.

Accordingly the objects of the present improvements include in general the provision of a preferably compression ignition internal combustion engine including a suitable valve apparatus, the engine and its valve apparatus being adapted for relatively high speed and relatively high compression operation, and preferably including the improvements set forth in my said U. S. Letters Patent No. 1,960,093.

More particularly, the objects of the present improvements include the provision of a "valve-in-head" engine in which the cam shaft is operatively mounted in the crank case and in which the valves are operatively mounted in the cylinder head and are actuated by rocker arms operatively mounted on the cylinder head and push rods extending between the rocker arms and the cam shaft preferably through the cylinder block of the engine, and with these parts associated with each other and with other parts, whereby an adequate supply of lubricant is provided for the valves. rocker arms and associated parts on the cylinder head, whereby substantially no lubricating oil is permitted to leak into the combustion chambers of the engine, whereby the crank case gases are sealed therein and prevented from contacting the valves, rocker arms and associated parts, and whereby the push rods are sealed from the cooling chambers of the cylinder block, and whereby the use of usual oil supply and return tubes of copper or the like between the crank case and the valves, rocker arms and associated parts in and on the cylinder head is minimized.

Further objects of the present improvements include the provision of improved details of construction and arrangement for certain of the parts of the engine and the valve apparatus therefor.

The foregoing and other objects are attained by the improvements, apparatus, parts, combinations, and sub-combinations, which comprise the present invention, and the nature of which is set forth in the following general statement, and preferred embodiments of which, together with their mode of use, are set forth in the following description, and which are particularly and distinctly pointed out and set forth in the appended claims forming part hereof.

The nature of the improvements of the present invention may be described in general terms as including in an internal combustion engine in combination with other usual or improved parts, a cylinder block having one or more cylinders provided therein, each cylinder having a bore extending therethrough, a cylinder head having a preferably flat inner face extending transversely across one end of each cylinder bore, a piston operatively mounted for reciprocation in each cylinder bore, each piston having a preferably flat end face located opposite and parallel with its preferably flat cylinder head inner face, and each cylinder head inner face and its cylinder bore and its piston end face forming therebetween a varying volume chamber, walls having inner faces forming one or more separate constant volume chambers, one for each cylinder, each constant volume chamber being located closely adjacent its cylinder, and walls forming one or more passageways, each passageway communicatingly connecting at one end with the constant volume chamber for one of the cylinders and at the other end with the adjacent cylinder bore, each constant volume chamber and varying volume chamber preferably being of the form and arrangement set forth in my said U. S. Letters Patent No. 1,960,093.

Means are provided for injecting fuel into the constant volume chambers preferably according to the disclosure of my said U. S. Letters Patent No. 1,960,093.

The engine is furthermore provided with improved valve apparatus, preferably including valves operatively mounted in the cylinder head, some of the valves being arranged for introducing a combustion supporting medium into the varying volume chambers, the combustion supporting medium being usually atmospheric air containing the usual amount of gaseous oxygen, and others of the valves being arranged for exhausting the products of combustion from the chambers of the cylinders. Springs and rocker arm means are operatively mounted on the cylinder head and operatively associated with the valves, and the engine includes a crank case operatively mounted at the other end of the cylinder block opposite the cylinder head, a cam shaft operatively mounted in the crank case, push rods operatively mounted between the cam shaft and the rocker arms, the push rods extending through cooling chambers in the cylinder block.

The cylinder block preferably includes sealing and lubricant return tubes of novel construction, one for each push rod, and through which the push rods extend, each of said sealing and lubricant return tubes preferably depending below the cylinder block into the interior of the crank case, and a seal cup is provided on each push rod at the lower end thereof below the bottom of its sealing and lubricant return tube, the lower end of each of said tubes extending at all times within the interior of its adjacent cup on its push rod, whereby the cup remains full of lubricant or oil at all times with the level of the lubricant or oil in each cup being located above the lower end of the tube extending therein, whereby an oil seal is formed about the lower end of each tube, effectively preventing escape of crank case gases upwardly from the crank case through the tubes.

The crank case has a lubricant or oil reservoir or sump therein, and means are provided for delivering oil from said reservoir to the rocker arm means and valves on the cylinder head, the rocker arm means preferably including a tubular shaft upon which rocker arms are oscillatably mounted, the tubular rocker arm shaft preferably being connected with the lubricant delivery means and including metering apertures for each rocker arm, preferably releasable means for maintaining the rocker arm shafts stationary and with the metering apertures thereof in proper alinement with the rocker arms.

The cylinder head moreover preferably includes a sloping drainage wall sloping from the valves towards the return tubes, and the cylinder head and return tubes have oil return ports formed therein in communicating location with respect to each other.

The engine preferably includes further novel improvements as illustrated in the drawings and/or as hereinafter set forth.

A compression ignition internal combustion engine embodying among others the present improvements is illustrated in the accompanying drawings forming part hereof, in which.

Similar numerals refer to similar parts throughout the drawings.

Figure 1:
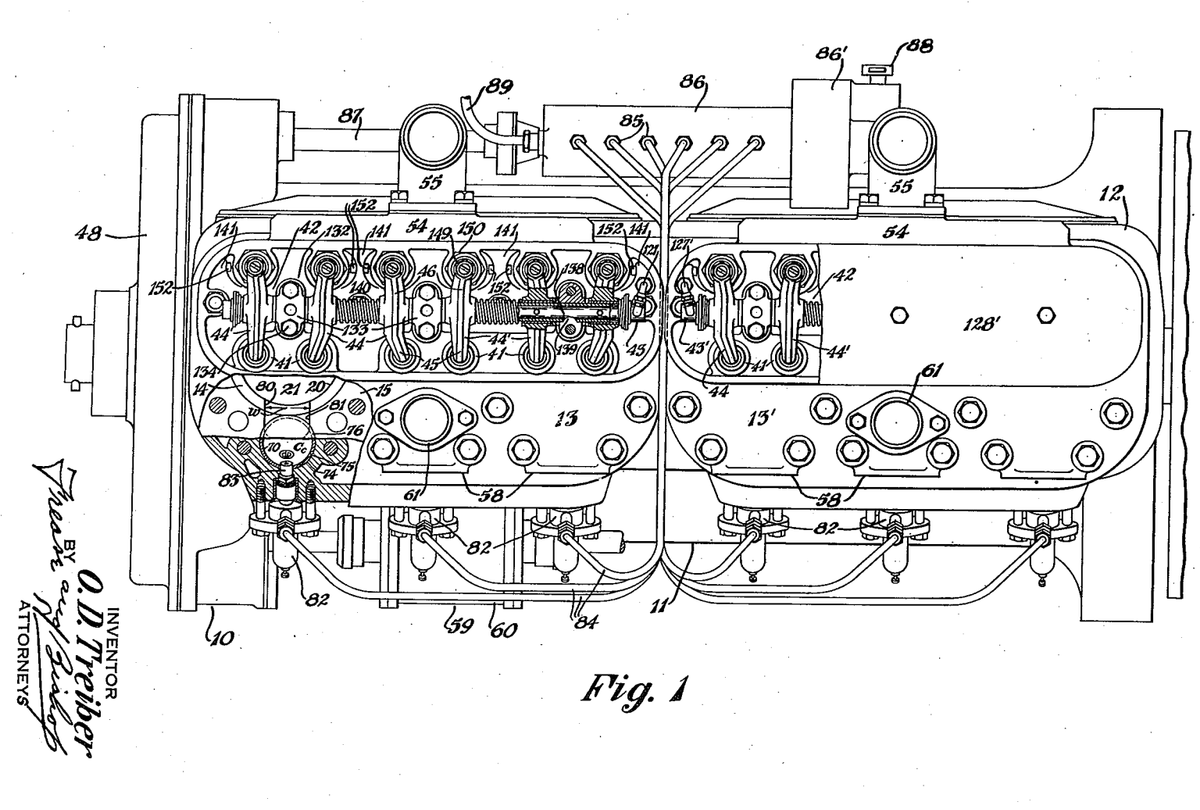
Figure 1 is a fragmentary top plan view of the engine, with portions broken away to illustrate details of construction and arrangement.
Figure 2:
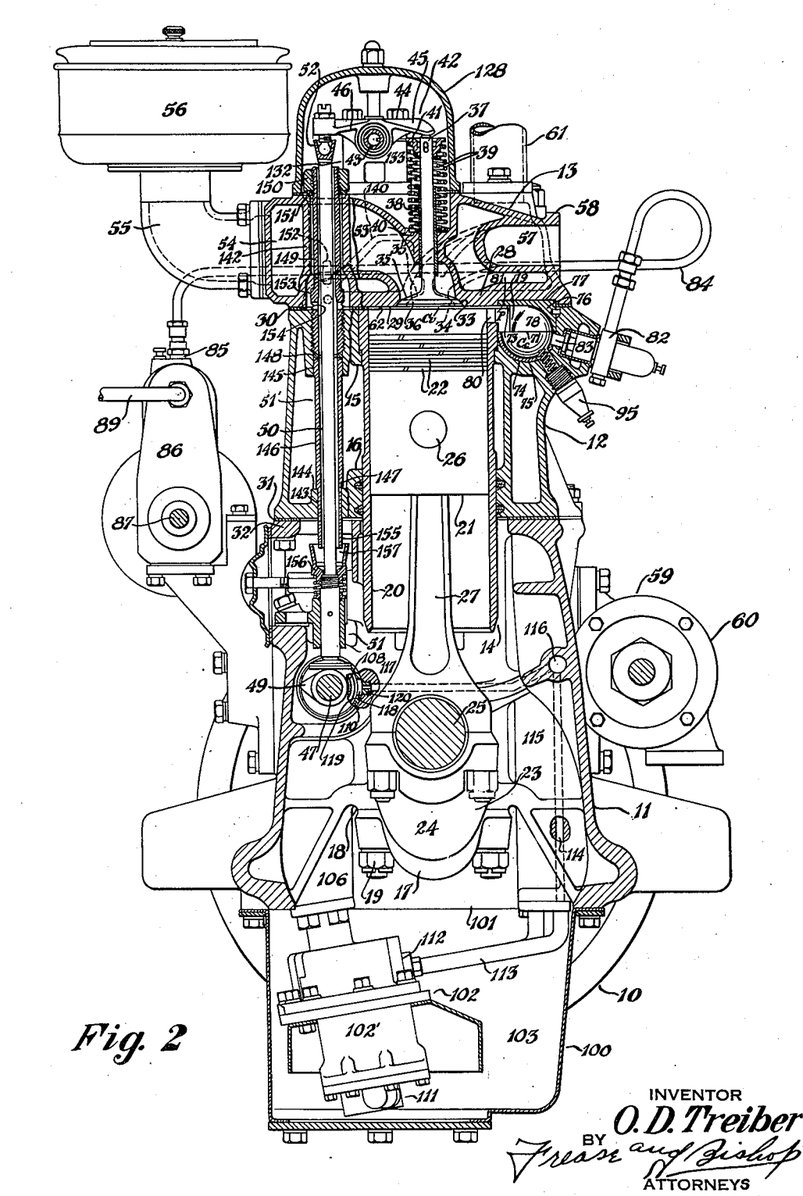
Fig. 2, a slightly enlarged transverse sectional view thereof, with portions broken away, and illustrating one of the cylinders of the engine and its piston and the combustion chambers associated therewith; and also illustrating partly in vertical section and partly in elevation the associated and improved valve apparatus including the improved lubricating means therefor and the improved crank case gas seal; and further illustrating an air cleaner in place on one of the air intake elbows of the engine.
Figure 3:
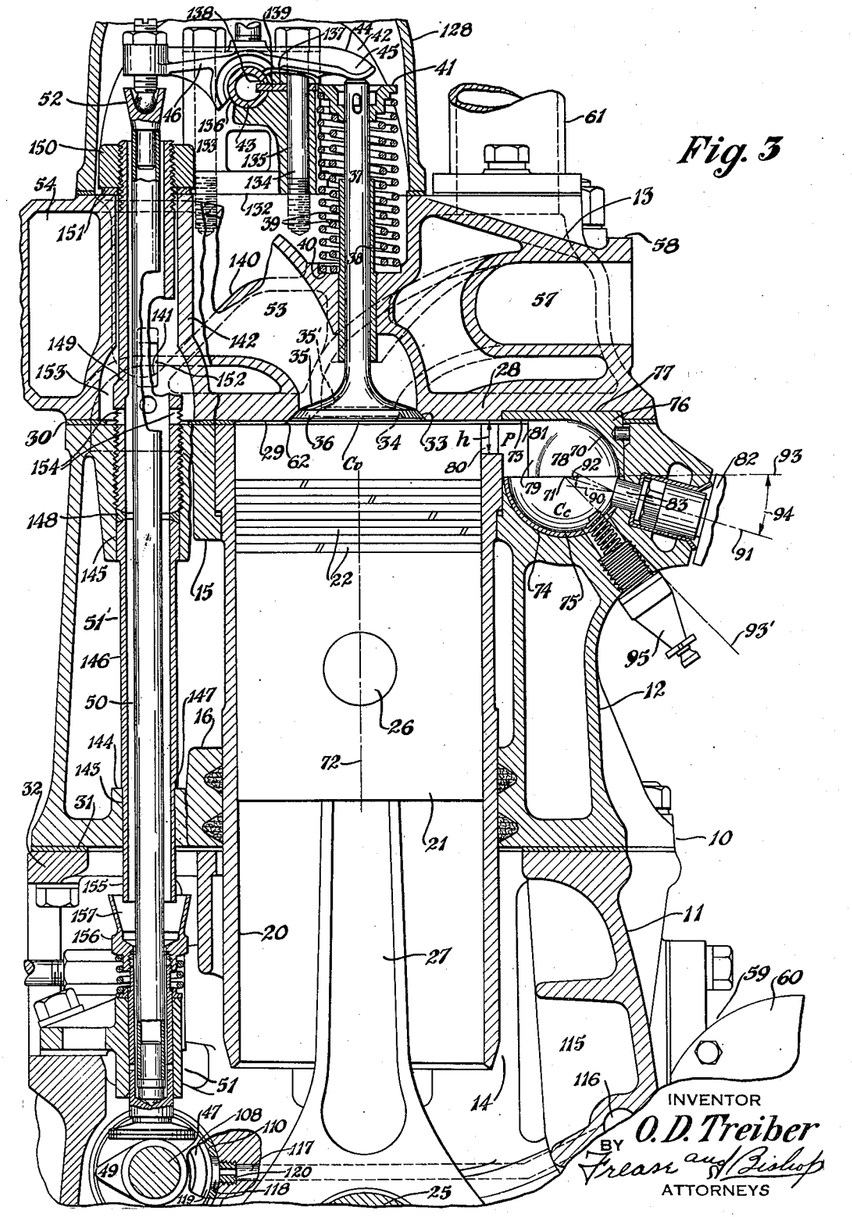
Fig. 3, a still further enlarged fragmentary view of portions of Fig. 2.
Figure 4:
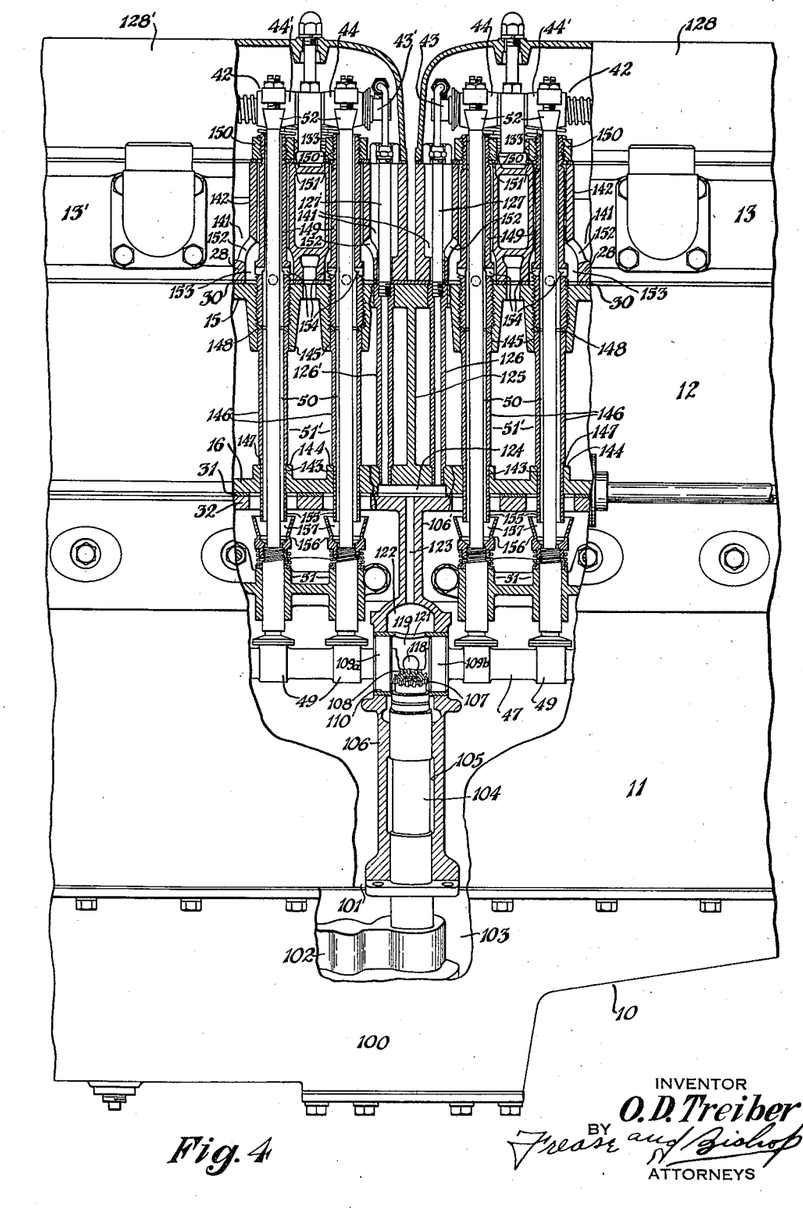
Fig. 4, a fragmentary side elevation view of the engine, looking in the direction of the arrows 4—4, Fig. 1, with portions broken away and illustrated in longitudinal vertical section, and showing the improved valve apparatus and associated parts.
Figure 5:
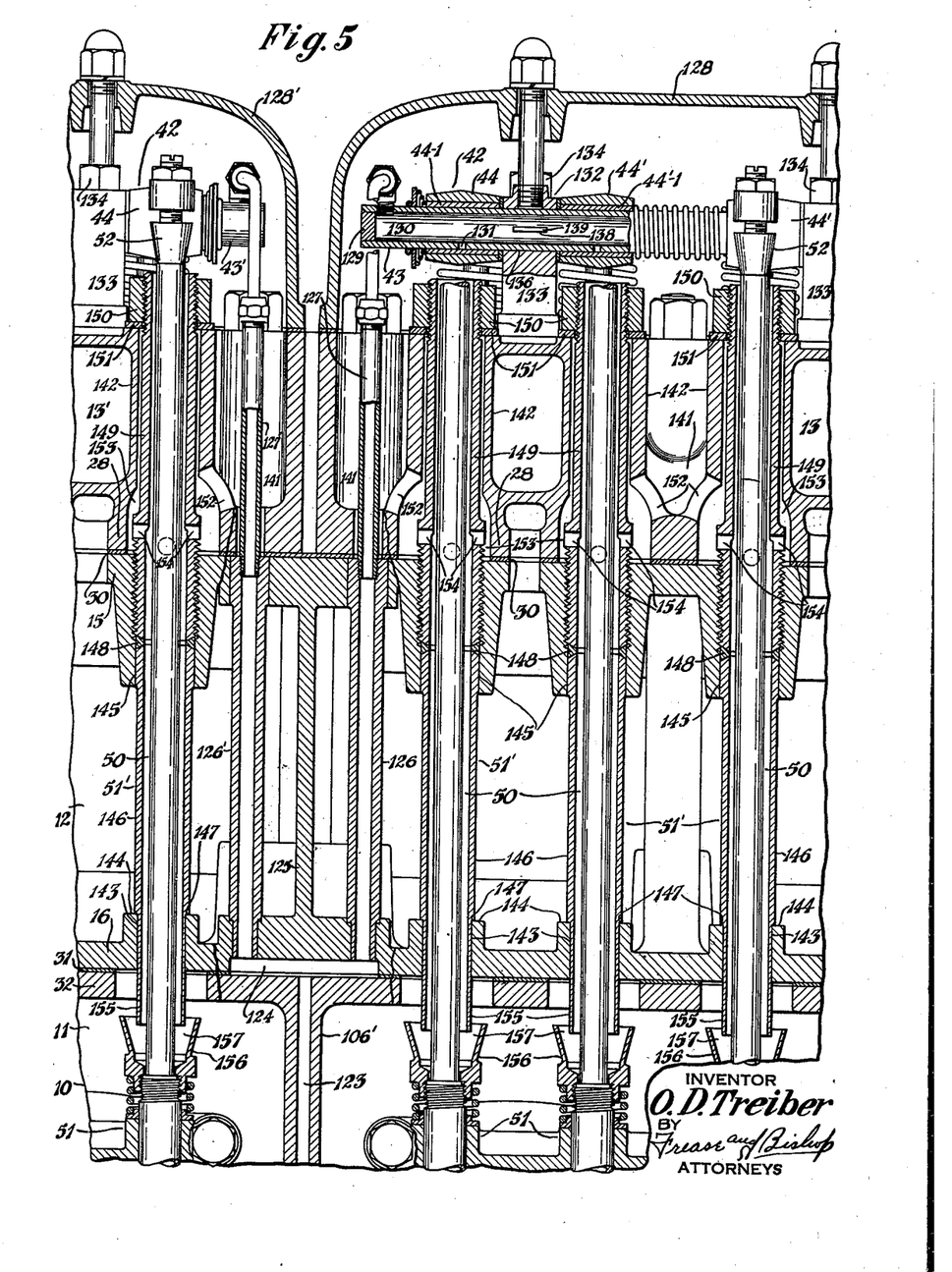
Fig. 5, an enlarged fragmentary view of portions of Fig. 4.

The compression ignition internal combustion engine embodying among others the present improvements is indicated generally at 10, and as illustrated is a six cylinder, four stroke cycle, single action, high speed, compression ignition internal combustion engine, in which the air for combustion is obtained normally directly from the atmosphere, and in which separate quantities or charges of the preferred liquid hydrocarbon fuel, such as Diesel oil, are successively injected into the combustion chambers of the engine at successive timed intervals, one charge being injected into the combustion chambers of each cylinder during each four stroke cycle of the piston operatively mounted in the cylinder.

The compression ignition internal combustion engine 10, includes in combination with other usual parts of a high speed internal combustion engine, a crank case 11, a cylinder block 12, and cylinder heads 13 and 13'.

The cylinder block 12 includes therein walls forming the cylinders, one of which is illustrated in detail in the drawings and is indicated at 14, and the cylinders 14 as illustrated are preferably in the form of externally shouldered sleeves each of which extends through and is seal seated in registering bores formed respectively in the normally upper cylinder block wall 15 and the normally lower cylinder block wall 16.

The cylinder heads 13 and 13', the cylinder block 12, the crank case 11, and the lower half 17 of each main bearing block 18 are preferably separable, and are preferably unitarily secured together by the eccentric shouldered through bolt means set forth in the prior application of Charles Ba'ough, for Engine structures, filed November 22, 1930, Serial No. 497,589, the lower ends of such through bolts and the nuts therefor being shown at 19 in the drawings.

In the bore 20 of each of the sleeve cylinders 14, a piston 21 provided with piston rings 22 is operatively mounted in a usual manner for high speed engines for reciprocation in the cylinder bore.

A crank shaft 23 is operatively mounted in a usual manner for high speed engines in the crank case in the main bearing blocks 18, and the crank shaft 23 includes, opposite each piston 21, crank arms 24 between the outer ends of which extends a crank pin 25, and each piston 21 has operatively mounted therein in a usual manner for high speed engines a wrist pin 26, and a connecting rod 27 operatively connects each crank pin 25 with each wrist pin 26.

It is to be particularly noted that the crank shaft 23, the connecting rods 27, the wrist pins 26, and the pistons 21 are not only operatively associated with each other as aforesaid in a usual manner for high speed engines, but are each of the size, proportion, and minimum weight, characteristic of such parts for high speed engines.

Each cylinder head 13 and 13', includes a normally lower wall 28, each of which is provided for each cylinder covered thereby with a preferably flat normally lower surface 29 extending transversely across the upper end of the bore of the particular cylinder.

A usual gasket 30 is interposed in the usual manner between the normally lower wall 28 of each of the cylinder heads 13 and 13', and the normally upper wall 15 of the cylinder block 12, and similarly a usual gasket 31 is interposed in the usual manner between the normally lower wall 16 of the cylinder block 12 and the normally upper wall 32 of the crank case 11.

As illustrated the engine 10 is a valve-in-head engine, and accordingly each normally lower wall 28 of the cylinder heads 13 and 13' has formed therein above the normally upper end of the bore of each cylinder covered thereby, an air intake valve seat orifice 33 and an exhaust valve seat orifice 34, and each of the valve seat orifices has a valve seat formed therein.

A valve 35 is operatively associated with each valve seat orifice 33, and a valve 35' is operatively associated with each valve seat orifice 34, and each of the valves includes a valve head 36 fitting in its respective seat, and a valve stem 37 extending upwardly from the head.

The cylinder heads 13 and 13' have mounted therein valve stem guide tubes 38, one for each valve stem 37, and each valve head 36 is normally maintained in its seat by usual means such as a set of compression springs 39, one end of which reacts against a spring seat 40 formed about each valve stem guide tube 38 in the cylinder head 13, and the other end of which reacts against a flanged washer 41 secured in a usual manner at the upper end of the particular valve stem 37.

A rocker arm cluster indicated generally at 42 is operatively mounted above each cylinder on rocker arm shafts 43 and 43' which are mounted respectively on the tops of the cylinder heads 13 and 13', each rocker arm cluster including a rocker member 44 for the air intake valve for the particular cylinder, and a rocker member 44' for the exhaust valve for the particular cylinder, and each of the rocker members includes a valve stem actuating arm 45 extending from one side of the rocker arm shaft 43 or 43' above and in sliding abutment with the upper end of its particular valve stem, and likewise each rocker member includes a push rod actuated arm 46 extending from the opposite side of the rocker arm shaft 43 or 43'.

A cam shaft 47 is operatively mounted in the crank case 11 at one side of the crank shaft 23, and the cam shaft is driven in a usual manner by the crank shaft as by means of gearing located within the gear housing 48 provided at one end of the crank case.

A cam 49 is provided on the cam shaft 47 for each valve, and a push rod indicated generally by 50 is operatively mounted between each cam 49 and one of the push rod actuated arms 46, each push rod being slidably mounted in push rod guide bearing means indicated generally by 51 and located in the crank case 11, and each push rod extends through sealing and lubricant return tube means indicated generally by 51' and located in the crank case 11, in the cylinder block 12, and in one of the cylinder heads 13 or 13', and the lower end of each push rod 50 abuts against the cam surface of its cam 49, and the upper end of each push rod 50 is provided with a ball and socket connection 52 with its push rod actuated arm 46.

Each air intake valve seat orifice 33 communicatingly connects with one end of an air intake port or passageway 53, the intake ports 53 being formed in the walls of the cylinder heads 13 and 13', and the intake ports of each cylinder head connecting at their outer ends with an intake manifold 54, and each intake manifold 54 communicatingly connecting as by means of an elbow 55 preferably with an air cleaner 56.

Each exhaust valve seat orifice 34 communicatingly connects with one end of an exhaust port or passageway 57, the exhaust ports 57 being formed in the walls of the cylinder heads 13 and 13' and the exhaust ports of each cylinder head terminating at their outer ends in a connector flange 58 whereby the exhaust ports may be communicatingly connected with an exhaust manifold, not shown.

Cooling means indicated generally by 59 are provided for the engine 10, and include a water pump 60 operatively connected in a usual manner with the crank shaft 23 as by means of gearing contained in the gear housing 48, the pump 60 delivering water into communicating water jacket chambers formed in the crank case, in the cylinder block, and in the cylinder heads, and the water jackets of each cylinder head being provided with a cooling water outlet pipe 61 which may be connected in the usual manner with a radiator, not shown, and the radiator being in turn connected in a usual manner with the intake of the pump 60.

In the engine 10, a chamber $C_v$ is formed within the bore 20 of each cylinder 14 and between a normally top or end flat circular face 62 of the piston 21 operating within the particular bore 20 and the opposite flat circular normally lower inner surface or face 29 of the normally lower cylinder head wall 28 covering the particular bore 20.

Each of the chambers $C_v$ by reason of the reciprocation of the piston forming one wall of the same may be termed a varying volume chamber, and in the engine 10, at top dead center, that is when the end face 62 of each piston 21 has reached its position of maximum travel away from the crank shaft 23, there is only mechanical clearance between the end face 62 of the piston and the opposite flat cylinder head inner face 29.

Walls of the engine form constant volume chambers, one for each cylinder. Each constant volume chamber $C_c$ is located closely adjacent to and entirely at the side of the corresponding varying volume chamber $C_v$, and between each constant volume chamber $C_c$ and its cylinder, walls of the engine form a passageway P communicatingly connecting at one end with the particular constant volume chamber $C_c$ and at the other end with the cylinder bore of the adjacent varying volume chamber $C_v$.

Each constant volume chamber $C_c$ is formed with a curved inner surface 70 which is symmetrical about an axis extending through the center 71 of the constant volume chamber and at right angles to the plane passing through the center 71 of the constant volume chamber and the axial direction or line of movement 72 of the piston 21 in the adjacent cylinder.

As illustrated, the curved inner face 70 of each constant volume chamber $C_c$ is preferably spherical.

Each passageway P connecting a particular constant volume chamber $C_c$ with the adjacent varying volume chamber $C_v$ is provided with an inner face 73 which is laterally continuous with the preferably flat inner cylinder head face 29 of the adjacent varying volume chamber $C_v$, and each laterally continuous passageway face 73 is tangential with the curved inner surface 70 of the constant volume chamber $C_c$ connected with the adjacent varying volume chamber $C_v$ by the particular passageway P.

The width $w$ of each passageway P is preferably as illustrated somewhat less than the diameter of the preferred spherical inner surface 70 for each constant volume chamber $C_c$, and the minimum height $h$ of each passageway P is preferably somewhat less than the radius of the preferred spherical inner surface 70.

As illustrated each constant volume chamber $C_c$ is formed in a socket 74 provided in the upper end wall 15 of the cylinder block. The bottom surface of each socket 74 is hemispherical and the top surface of each socket 74 is cylindric and tangential with the bottom hemispherical surface.

Preferably a removable liner shell 75 is located in the bottom of each socket 74, each liner shell 75 being preferably externally and internally hemispherical, and the internal hemispherical surface of each liner shell 75 forming a portion of the spherical inner surface 70 of the constant volume chamber $C_c$ formed in part by the particular liner shell 75.

In the upper cylindric end of each socket 74, a preferably removable member 76 is located, and as illustrated each member 76 is externally cylindric and its upper end extends beyond the normally top wall 15 of the cylinder block and into a cylindric recess 77 formed in the adjacent cylinder head lower wall 28.

In the normally lower face of each member 76 is formed a cavity 78 which includes the normally upper portions of the spherical inner surface 70 of the particular constant volume chamber $C_c$ formed in part by the particular member 76, and each cavity 78 also includes end portions 79 of the passageway P communicatingly connecting the particular constant volume chamber $C_c$ with the adjacent varying volume chamber $C_v$.

The remaining portions of each passageway P are formed by an extension of the inner face 29 of the adjacent and connected varying volume chamber $C_v$, and by the side and bottom faces of a notch 80 formed in the upper end of the cylinder sleeve 14 of the particular chamber $C_v$ and by the side and bottom faces of a notch 81 formed in the wall 15 of the cylinder block between the cylinder sleeve notch 80 and the adjacent socket 74.

The air intake valve means heretofore described in general comprise means operated in a usual manner for introducing preferably atmospheric air including gaseous oxygen, or in other words a combustion supporting medium, into each varying volume chamber $C_v$ on the air intake stroke of the piston thereof; and the exhaust valve means heretofore described in general, provide means for exhausting each varying volume chamber $C_v$ during the exhaust stroke of the piston thereof.

Means are also provided for injecting the preferably liquid hydrocarbon fuel into each constant volume chamber $C_c$ preferably during the compression stroke of the associated piston, and as illustrated the fuel injecting means includes for each constant volume chamber $C_c$ a pintle nozzle 82 each of which is operatively mounted in the cylinder block 12, and the discharge end 83 of each of which extends into and terminates in the constant volume chamber $C_c$, with which the particular nozzle is associated.

Each nozzle 82 is communicatingly connected in a usual manner by a tube 84 with one of the discharge outlets 85 of a usual fuel supply and distributing pump 86 which is driven by a shaft 87 connected in a usual manner with the gearing contained in the gear housing 48. The pump 86 includes timed means injecting a charge of fuel during the proper interval through each of the tubes 84 and the nozzle 82 served thereby into the particular constant volume chamber $C_c$ with which the particular nozzle 82 is associated.

The pump 86 includes governing means which may be contained within casing portions 86' and which are controlled by a control arm 88 which is in effect the throttle for the engine; and the pump 86 is connected by a main fuel supply tube 89 in a usual manner with a source of the desired liquid fuel.

Each nozzle 82 is of usual construction, and is adapted to introduce into the constant volume chamber $C_c$ with which it is associated an atomized conical spray 90 of fuel particles which has its origin located between the plane of the inner face of the cylinder head and a plane of displacement of the piston from the inner face of the cylinder head, that is, at the crank shaft side of the passageway; and the spray is preferably directed towards the passageway P connecting with the particular chamber $C_c$ and in any event, toward the plane of the inner face of the cylinder head.

The longitudinal axis 91 of each conical spray 90 preferably passes through the center 71 of the preferably spherical constant volume chamber $C_c$ served thereby, and according to the improvements set forth in my said U. S. Letters Patent No. 1,960,093, the apex angle 92 of each conical spray should be substantially no greater than 10 degrees and substantially no less than 6 degrees; and the best results are attained when the apex angle 92 of each conical spray 90 is 8 degrees.

Also according to the improvements set forth in my said U. S. Letters Patent No. 1,960,093, the longitudinal axis 91 of each conical fuel spray 90 is directed as aforesaid preferably through the center 71 of the constant volume chamber $C_c$ served thereby, and towards the passageway P connecting the particular constant volume chamber $C_c$ with the adjacent varying volume chamber $C_v$; and the axis 91 is located between planes 93 and 93' passing through the center 71 of the spherical constant volume chamber $C_c$ served by the particular spray, the plane 93 being parallel with the inner preferably flat cylindric head face 29 of the adjacent varying volume chamber $C_v$, and the plane 93' extending through the center of the particular spherical constant volume chamber $C_c$ and towards the associated flat inner cylinder head face 29 and at an angle of 45 degrees with the plane 93 and thus with the plane of the particular flat inner cylinder head face 29; and the best results are attained when the angle 94 of the longitudinal axis 91 of each conical spray with respect to the plane 93 and thus with respect to the plane of the associated flat inner cylinder head face 29 is 16 degrees.

Each plane 93 may be described in other words as extending through the center 71 of its constant volume chamber $C_c$ and at right angles with respect to the axial direction or line of movement 72 of the associated piston.

As aforesaid mechanical clearance only is preferably provided between each flat piston end face 62 and the opposite flat inner cylinder head face 29 at the top dead center position of the piston, and the total volume of each constant volume chamber $C_c$ and the associated passageway P, which constitute the clearance volume of the particular cylinder, is small relative to the maximum volume of the associated varying volume chamber $C_v$, so that the compression ratio of the engine may be high, for example 15.8 to 1.

It is also preferred as aforesaid that the length of each passageway P be as short as possible, and as illustrated the length of each passageway P is as short as the particular construction and arrangement of the engine 10 will permit.

In the illustrated engine 10, for starting purposes, a usual glow tube 95 is provided in a usual manner for each constant volume chamber Cc.

In the foregoing, the engine 10 is described as including the improvements set forth in my said U. S. Letters Patent No. 1,960,093, and with which the present improvements are preferably combined, and according to which the engine 10 furthermore includes a lubricant reservoir or oil pan 100 for the lower opening 101 of the crank case 11; and a lubricant or oil pump 102 is located within the compartment 103 of the reservoir or oil pan 100; and the pump 102 includes a housing 102' in which gear pump mechanism, not shown, is operatively mounted, and a drive shaft 104 extending upwardly through a bore 105 formed preferably in a central crank case transverse wall 106.

At the upper end of the pump drive shaft 104 a spiral pinion or gear 107 is secured and meshes with a spiral gear 108 preferably formed on the central portion of the cam shaft 47, preferably between longitudinally spaced central cam shaft bearings or journal rings 109a and 109b provided on the cam shaft 47 and which are journalled in opposite ends of a bushing or bearing sleeve 110 which fits in a suitable horizontally and longitudinally extending bore formed in the crank case central transverse wall 106.

The pump 102 furthermore includes an inlet at the lower end 111 of its housing 102', and one or more outlets at the inner side 112 of its housing 102' one of the outlets being communicatingly connected for the purposes of the present invention, with one end of a lubricant or oil delivery tube 113, the other end of which communicatingly connects with the lower end of a lubricant main uptake bore 114 which is formed in a central rib flange portion 115 of the crank case transverse wall 106.

The upper end of the uptake bore 114 communicates with a longitudinally extending lubricant main distributing bore 116 formed as illustrated in the crank case 11 at the side thereof opposite the cam shaft 47.

Lateral lubricant distributing bores, not shown, extend from the main distributing bore 116 to the several main bearings of the crank shaft 23 in a usual manner; and for the purposes of the present invention, a lateral distributing bore 117 is formed in the transverse central wall 106 of the crank case, and one end of the bore 117 communicates with the main distributing bore 116 and the other end of the lateral distributing bore 117 communicates through an opening 118 in the central cam shaft bearing bushing or sleeve 110 with a cam shaft drive gear lubricating chamber 119 which is formed by the above described arrangement of the longitudinally spaced cam shaft central bearings 109a and 109b being journalled at opposite ends of the bushing 110.

A metering orificed plug 120 is preferably provided at the end of the bore 117 adjacent the bushing opening 118, so that the engine parts lubricated beyond the metering orificed plug 120 will receive definite and proper amounts of lubricant.

The bushing or sleeve 110 has formed therein an upper opening 121 which communicates with a sub-reservoir chamber 122 formed in the crank case central wall 106.

The upper end of the chamber 122 communicates at its lower end with an intermediate lubricant uptake bore 123 formed in the upper portions 106' of the crank case central wall 106, and the upper end of the intermediate uptake bore 123 terminates in the crank case upper wall 32 and communicates with a distributing pocket 124 formed in the normally lower wall 16 of the cylinder block 12.

The cylinder block 12 includes a central transverse wall 125, and a cylinder block lubricant uptake tube 126 is provided at one side of the cylinder block wall 125, and the tube 126 communicates at its lower end with the upper end of the pocket 124, and communicatingly connects at its upper end with the lower end of a cylinder head lubricant uptake tube 127, which may be formed as illustrated of several jointed sections, and the upper end of which communicatingly connects with the tubular rocker arm shaft 43 operatively mounted on the cylinder head 13.

Similarly, at the other side of the cylinder block transverse wall 125, a cylinder block uptake tube 126' is provided and communicates at its lower end with the upper end of the pocket 124, and communicatingly connects at its upper end with the lower end of a cylinder head uptake tube 127', which may be formed as illustrated of several jointed sections, and the upper end of which communicatingly connects with the tubular rocker arm shaft 43' operatively mounted on the cylinder head 13', as aforesaid.

The cylinder head 13 is preferably provided with a removable dome cover 128 enclosing the several parts of the valve apparatus and other parts of the engine located on the top of or extending above the cylinder head 13, and a similar cover 128' is provided for the cylinder head 13'.

The tubular rocker arm shaft 43 is provided with a closure plug 129 at its end adjacent to and beyond the connection of the cylinder head uptake tube 127 therewith, so that lubricant introduced into the bore 130 of the rocker arm shaft 43 will not leak out of the plugged end of the shaft, and will flow longitudinally through the bore 130 of the shaft 43, and lubricating apertures 131 are formed in the tubular rocker arm shaft 43, one for the bearing sleeve of each of the rocker arm members 44 and 44'.

The rocker arm shaft 43' is similarly provided with a plug and with lubricating apertures.

For maintaining the lubricating apertures of the rocker arm shafts centrally disposed with respect to the rocker members oscillatably mounted thereon and for clamping and maintaining the shafts stationary, improved rocker arm shaft mounting means indicated generally by 132 are provided and secured upon the respective cylinder heads 13 and 13'.

Each of the improved mounting means 132 includes a block 133 which is interposed between one of the sets of rocker members 44 and 44', and secured to its cylinder head 13 or 13' as by means of bolts 134, the shanks of which pass through suitable normally vertical bores 135 formed in the block, the threaded lower ends of the bolts screwing into suitable threaded bores formed in the cylinder heads, and the heads of the bolts clamping against the upper end of the block.

Each block 133 has a normally horizontal shaft bore 136 formed therein and located between the bores 135 and extending at right angles thereto, and the shafts 43 and 43' extend through the bores 136 of their respective blocks 133.

Each block 133 has formed therein a split 137 extending from one side thereof to the bore 136.

Each of the shafts 43 and 43' is provided with a plurality of locking grooves 138, one for each block 133. An apertured shim tongue 139 is inserted in the split 137 of each block 133 and the inner end of each shim tongue 139 extends into and engages the adjacent locking groove 138.

The shank of the bolt 134 at the split side of each mounting block 133 extends through a suitable aperture formed in the shim tongue 139, and accordingly when the bolts 134 thus extending through the shim tongues of the blocks 133 are screwed up, the shafts 43 and 43' are securely mounted on their respective cylinder heads 13 and 13', are positively maintained against rotation and against longitudinal displacement, so that the lubricating apertures 131 of the rocker arm shafts are always properly alined with the rocker members served thereby, and so that the connections of the cylinder head uptake tubes with the rocker arm shafts are not disturbed.

Through the above described tubes, bores, and the intervening chambers and pockets, lubricant, usually oil, is delivered in operation of the engine from the pump 102 to the bearing sleeves 44—1 and 44'—1, respectively, of the rocker members 44 and 44', the lubricant being finally delivered to the sleeves 44—1 and 44'—1 through the rocker arm shaft apertures 131, and the lubricant emerges, spatters, or drips from the ends of the sleeves 44—1 and 44'—1 and about the rocker arm shafts and falls upon the top faces of the cylinder heads, and about the valve stems 37.

The spring seats 40 for the valve springs are formed on the top faces of the cylinder heads at a substantial elevation above the cylinder head lower walls 28, and lubricant or oil striking the valve stems 37 above the valve stem guide tubes 38 is adequate for properly lubricating the valve stems.

For the purpose of preventing excess lubricant from entering the combustion chambers of the engine about the valve stems, the top walls of the cylinder heads 13 and 13', each includes laterally sloping drainage walls 140, which slope laterally from the elevation of the valve spring seats 40 outwardly and towards the lower walls 28 of the cylinder heads, and the sloping walls 140 preferably terminate at the push rod side of the cylinder heads, in troughs 141.

Accordingly even when the engine is tipped or swayed laterally as in use in a bus or the like, oil falling on the cylinder head top faces about the valve stems will drain down the sloping walls 140 into the troughs 141.

Each of the cylinder heads 13 and 13', furthermore preferably includes a plurality of tubular pillars 142, which cooperate with the sealing and lubricant return tube means 51', so that each of the improved sealing and lubricant return tube means 51' in the preferred form illustrated, also serves in part as a cylinder head securing or hold-down means, and the preferred construction and arrangement of the sealing, lubricant return tube and cylinder head hold-down means 51' is as follows:

The cylinder block lower wall 16 has formed therein a plurality of sealing bores 143 terminating at their upper ends in shouldered seats 144. The cylinder block upper wall 15 has also formed therein a plurality of sealing and clamping bores 145 registering with the sealing bores 143 in the lower cylinder block wall. Each of the lower bores 143 is preferably cylindric and each of the upper bores 145 is preferably cylindric at its lower end and is internally threaded at its upper end.

Lower sealing and lubricant return tubes 146 extend through and fit the sets of registering bores 143 and 145, and each tube 146 is preferably provided with a lower shoulder 147 abutting against the upper shouldered seat 144 of its bore 143, and the upper end of each tube 146 fits in the lower cylindric portion of its bore 145.

The tubes 146 are preferably made of steel, and against the upper end of each tube 146, a preferably lead washer 148 is inserted in the lower cylindric portion of the bore 145 for the particular tube 146. Upper sealing lubricant return and cylinder head hold-down tubes 149 are provided, one extending through the bore of each of the tubular pillars 142, and having its lower end externally threaded and screwed into the threaded upper end of the bore 145, the bores 145 being registered with the bores of the tubular pillars 142, whereby each lower tube 146 is securely clamped, seated and sealed in its cylinder block bores, by its upper tube 149.

The upper end of each upper tube 149 extends above the upper end of its enclosing tubular pillar 142, and is preferably externally threaded as illustrated, and an internally threaded nut 150 is screwed on the upper threaded end of each upper tube 149, preferably with a washer 151 interposed between each nut 150 and the upper end of each pillar 142, whereby the tubes 149 and nuts 150 serve as hold-down means for the cylinder heads.

Each of the pillars 142 has formed therein a lubricant return aperture 152 providing a communication from one of the troughs 141 with the lower end portion 153 of the bore of the pillar.

Each of the upper tubes 149 has formed therein above the upper wall 15 of the cylinder block, a plurality of lubricant return apertures 154, providing communication between the lower end portions 153 of the bores of the pillars 142 with the bores of the upper tubes 149 and consequently with the bores of the lower tubes 146 registered therewith.

Accordingly communication is effected between the troughs 141 and the bores of the upper and lower tubes 149 and 146 first through the pillar apertures 152 and then through the upper tube apertures 154.

The lower end portions 155 of the lower tubes 146 extend a substantial distance below the cylinder block lower wall 16 into the crank case interior.

The push rods indicated generally as aforesaid by 50, extend through the bores of the upper and lower tubes 149 and 146 of the tube means 51', and the push rods 50 have provided thereon upwardly opening sealing cup members 156, and each of the tube lower end portions 155 extends at all times into the sealing compartment 157 of the sealing cup 156 on the push rod 50 extending through the particular tube means 51'.

Consequently the lubricant flowing into the bores of the tube means 51' from the cylinder head through the pillar apertures 152 and the tube apertures 154, drops in and fills the sealing compartments 157 of the sealing cups 156 and thus seals the lower ends of the tube means 51', by reason of the extension of the tube lower end portions 155 into the sealing compartments 157 of the sealing cups 156, thus filled with lubricant or oil.

The novel sealing means between the crank case and the cylinder head, thus described, effectively prevents crank case gases from escaping through the bores of the tube means 51', and avoids the corrosion of the valve apparatus parts in particular and of other parts, which would otherwise occur by permitting the crank case gases to escape therefrom and to contact with the valve apparatus parts in the bores of the tube means 51' and on the cylinder heads 13 and 13'.

I claim:

1. In an internal combustion engine and the like having a cylinder, a cylinder head at the upper end of the cylinder, and a crank case at the lower end of the cylinder, valve means operatively mounted on the cylinder head, sealing and return tubes communicating between the interior of the crank case and the upper faces of the cylinder head, valve actuating means operatively associated with the valve means and including push rods extending through the sealing and return tubes, means for delivering lubricant from the interior of the crank case to parts of the valve actuating means and valve means on the cylinder head and to the upper faces of the cylinder head, the lower ends of the sealing and return tubes extending into the interior of the crank case, a cup on each push rod having a sealing compartment opening towards the lower end of the sealing and return tube for the push rod, and the lower end of each sealing and return tube extending at all times into the sealing compartment of the cup on its push rod, whereby lubricant may be returned from the upper faces of the cylinder head to the interior of the crank case through the sealing and return tubes, and whereby the sealing compartments are always full of lubricant to a level above the lower ends of the sealing and return tubes.

2. In an internal combustion engine and the like having a cylinder, a cylinder head at the upper end of the cylinder, and a crank case at the lower end of the cylinder, a sealing and return tube communicating between the interior of the crank case and the upper faces of the cylinder head, a longitudinally movable push rod extending through the sealing and return tube, means for delivering lubricant from the interior of the crank case to the upper faces of the cylinder head the lower end of the sealing and return tube extending into the interior of the crank case, a cup on the push rod having a sealing compartment opening towards the lower end of the sealing and return tube, and the lower end of the sealing and return tube extending at all times into the sealing compartment of the cup on the push rod, whereby lubricant may be returned from the upper faces of the cylinder head to the interior of the crank case through the sealing and return tube, and whereby the sealing compartment is always full of lubricant to a level above the lower end of the sealing and return tube.

3. In an internal combustion engine and the like having a cylinder, a cylinder head at the upper end of the cylinder, and a crank case at the lower end of the cylinder, a sealing and return tube communicating between the interior of the crank case and the upper faces of the cylinder head, the cylinder head upper faces including a face sloping towards the upper end of the sealing and return tube, a longitudinally movable push rod extending through the sealing and return tube, means for delivering lubricant from the interior of the crank case to the upper faces of the cylinder head, the lower end of the sealing and return tube extending into the interior of the crank case, a cup on the push rod having a sealing compartment opening towards the lower end of the sealing and return tube, and the lower end of the sealing and return tube extending at all times into the sealing compartment of the cup on the push rod, whereby lubricant may be returned from the upper faces of the cylinder head to the interior of the crank case through the sealing and return tube, and whereby the sealing compartment is always full of lubricant to a level above the lower end of the sealing and return tube.

4. In an internal combustion engine and the like having a cylinder, a cylinder head at the upper end of the cylinder, and a crank case at the lower end of the cylinder, gas sealing and lubricant return means operatively interposed between the interior of the crank case and the upper faces of the cylinder head, the gas sealing and return means including a tube communicating between the interior of the crank case and the upper faces of the cylinder head, a push rod movable in the tube, and an upwardly opening cup member on the push rod and forming a sealing compartment about the lower end of the tube and adapted for being constantly filled with lubricant and sealing the lower end of the tube.

OTIS D. TREIBER.